US010136247B2

(12) United States Patent
Tarlton

(10) Patent No.: US 10,136,247 B2
(45) Date of Patent: Nov. 20, 2018

(54) PHYSICAL AND VIRTUAL PHONE MOBILITY

(71) Applicant: Microsoft Technology Licensing, LLC, Redmond, WA (US)

(72) Inventor: Mark A. Tarlton, Bainbridge Island, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 139 days.

(21) Appl. No.: 14/918,101

(22) Filed: Oct. 20, 2015

(65) Prior Publication Data

US 2017/0111761 A1    Apr. 20, 2017

(51) Int. Cl.
| | |
|---|---|
| H04W 4/02 | (2018.01) |
| H04W 4/80 | (2018.01) |
| G06F 9/455 | (2018.01) |
| H04W 24/02 | (2009.01) |
| G06F 9/48 | (2006.01) |
| G06F 9/50 | (2006.01) |

(52) U.S. Cl.
CPC .......... *H04W 4/02* (2013.01); *G06F 9/45558* (2013.01); *G06F 9/4856* (2013.01); *G06F 9/5044* (2013.01); *H04W 4/80* (2018.02); *H04W 24/02* (2013.01); *G06F 2009/4557* (2013.01); *G06F 2209/502* (2013.01); *G06F 2209/509* (2013.01)

(58) Field of Classification Search
CPC .... H04L 67/1097; H04W 12/06; H04W 4/001
USPC ...... 455/411, 418, 419, 456.1; 370/254, 352
See application file for complete search history.

(56) References Cited

U.S. PATENT DOCUMENTS

| | | | |
|---|---|---|---|
| 6,208,724 B1 | 3/2001 | Fritzinger et al. | |
| 7,383,405 B2 | 6/2008 | Vega et al. | |

(Continued)

FOREIGN PATENT DOCUMENTS

| | | |
|---|---|---|
| CN | 103176899 A | 6/2013 |
| CN | 103345406 A | 10/2013 |

(Continued)

OTHER PUBLICATIONS

"Using the Emulato", Published on: Jun. 23, 2012 Available at: http://developer.android.com/tools/devices/emulator.html (16 pages total).
Tabor, et al., "Part 11—Working with the Windows Phone 8.1 Emulator", Published on: May 5, 2014 Available at: http://channel9.msdn.com/Series/Windows-Phone-8-1-Development-for-Absolute-Beginners/Part-11-Working-with-the-Windows-Phone-8-1-Emulator (14 pages total).

(Continued)

*Primary Examiner* — Sam Bhattacharya
(74) *Attorney, Agent, or Firm* — Mark K. Young; Mayer & Williams PC

(57) ABSTRACT

A physical and virtual phone mobility system enables application tasks and resources to be shared between a mobile device and a desktop device by hosting a virtual mobile device on the desktop device when the mobile device is determined to be within a predetermined proximity of the desktop device. The local resources available to the mobile device that are typically used to perform a given application task are compared with resources that are available to the desktop device. At least partial execution of the application may be transferred, along with some state information in some cases, from the mobile device to the desktop device based on the results of the comparison according to one or more transfer rules.

18 Claims, 8 Drawing Sheets

(56) References Cited

U.S. PATENT DOCUMENTS

| | | |
|---|---|---|
| 8,108,201 B2 | 1/2012 | Ragnunath et al. |
| 8,396,465 B2 | 3/2013 | Danford et al. |
| 8,438,256 B2 | 5/2013 | Rogel et al. |
| 2011/0257958 A1 | 10/2011 | Kildevaeld |
| 2011/0307795 A1* | 12/2011 | Guillou ............... G06F 3/04847 715/738 |
| 2013/0237147 A1 | 9/2013 | Dearman |
| 2014/0113550 A1* | 4/2014 | Li ........................... H04L 67/06 455/41.1 |
| 2014/0136667 A1 | 5/2014 | Gonsalves et al. |

FOREIGN PATENT DOCUMENTS

| | | |
|---|---|---|
| EP | 2575044 A1 | 4/2013 |
| EP | 2693336 A1 | 2/2014 |
| WO | 2005109829 A1 | 11/2005 |
| WO | 2012154748 A1 | 11/2012 |
| WO | 2014003797 A1 | 1/2014 |
| WO | 2014141180 A1 | 9/2014 |

OTHER PUBLICATIONS

Yosef, Itav, "Mobile Device Marketing and Intuitive VoIP Dialing", Published on: Jan. 23, 2013 Available at: http://www.patentauction.com/patent.php?nb=8492 (3 pages total).

"Setting up a Cross Platform Build Environment", Retrieved on: Jan. 20, 2015 Available at: https://github.com/MvvmCross/MvvmCross/wiki/Setting-up-a-Cross-Platform-Build-Environment (13 pages total).

"International Search Report and Written Opinion Issued in PCT Application No. PCT/US2016/056697", dated Jan. 31, 2017, 13 Pages.

Chun, et al., "CloneCloud: Elastic Execution between Mobile Device and Cloud", In Proceedings of the Sixth Conference on Computer systems, EuroSys, Apr. 10, 2011, pp. 301-314 (14 pages total).

"Second Written Opinion Issued in PCT Application No. PCT/US2016/056697", dated Sep. 22, 2017, 11 Pages.

* cited by examiner

PHYSICAL AND VIRTUAL PHONE MOBILITY

BACKGROUND

Smartphones, tablet computers, and other mobile small form factor devices are commonly used both as communications devices for making phone calls and sending messages, and as application platforms. However, even when users are sitting at a desktop personal computer (PC), they often use their mobile devices to perform tasks or to run applications that their desktop PCs are capable of hosting.

SUMMARY

A physical and virtual phone mobility system enables application tasks and resources to be shared between a mobile device and a desktop device by hosting a virtual mobile device on the desktop device when the mobile device is determined to be within a predetermined proximity of the desktop device. The local resources available to the mobile device that are typically used to perform a given application task are compared with resources that are available to the desktop device. At least partial execution of the application may be transferred, along with some state information in some cases, from the mobile device to the desktop device based on the results of the comparison according to one or more transfer rules.

The rules may be formulated so that particular application tasks are transferred, for example, when the desktop device has resources available to it that may enable more optimal performance of the tasks and/or increase efficiency of user interaction with the devices as compared to performing the tasks using only the local resources available to the mobile device. The compared device resources may include, for example, the configuration and availability of peripheral equipment such as input and output devices (keyboards, audio speakers, microphones, display screens, etc.), the quality of service (QoS), bandwidth, and/or level of security provided by external communication links, processor capabilities, memory and/or storage availability, the availability of data and content, and the configuration and capacity of power sources.

The physical and virtual phone mobility system can optimize usage of the collectively available device resources to increase efficiency of operations of either or both the mobile and desktop devices while also preserving limited resources such as battery power and network bandwidth. The effectiveness of user interactions with the devices may also be increased through more efficient input and output to and from the devices which can reduce user errors and increase the quality of user experiences.

The transfer rules can take into account user behaviors and preferences. For example, the physical and virtual phone mobility system can support manual initiations of task transfers by the user and enable the user to indicate preferences as to which application tasks are transferred, at what times, and under what circumstances or context. The system may also generate a notification to the user that suggests a transfer of certain application tasks when the mobile device is determined to be within the threshold proximity to the desktop device. The system may utilize the user preferences, the history of manual activations, and/or the user's responses to notifications in order to automatically transfer application tasks in some cases.

In an illustrative example, a virtual machine phone (VMPhone) is configured to operate on a desktop device (such as a personal computer (PC)) in which the PC functions as a proxy or surrogate for a physical mobile device (such as a mobile phone) when the mobile device is determined to be within a threshold proximity to the desktop device. Operations of a telephony application can be partially or fully transferred from the mobile device to the VMPhone on the desktop device. Such transfer may increase interaction efficiency and reduce user errors by virtue of the typically larger display screen and keyboard that are often available to the desktop device as user interface (UI) peripherals. Use of the VMPhone can provide a consistent user experience with the look and feel of the mobile telephony application while enabling reduced power consumption at the mobile device in some cases. Inbound calls can ring on the VMPhone, and outbound calls from the VMPhone can display the Caller ID associated with the mobile device. Data and state information such as contact lists, voicemail, call history, operating status and parameters, and the like from the mobile device may be available and utilized on the VMPhone on the desktop device as if the data were a local resource.

In other cases, the physical and virtual phone mobility system may determine that a more optimal allocation of tasks between the physical phone and VMPhone is for UI operations to be supported by the VMPhone while network operations are supported on the mobile device. For example, the QoS of a cellular connection on the mobile device may be greater than that of a Wi-Fi connection that is currently available to the desktop device, the Wi-Fi connection may be less secure, or the user may prefer to utilize the cellular connection under some conditions and contexts. Thus, the VMPhone on the desktop device can operate separately from the mobile device in a standalone mode, or operate in combination with the mobile device in a paired mode. In both operating modes, application tasks, data, and/or state information can move dynamically between the mobile device and VMPhone on the desktop device. For example, application tasks may be dynamically reallocated between the mobile device and VMPhone as conditions and context change in order to maintain more optimal operating states for one or both the devices and/or improved user experiences. Transfer of tasks and state may be performed seamlessly between the mobile and desktop devices so that applications do not need to maintain any awareness of the particular computing platform upon which they are running.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It may be appreciated that the above-described subject matter may be implemented as a computer-controlled apparatus, a computer process, a computing system, or as an article of manufacture such as one or more computer-readable storage media. These and various other features may be apparent from a reading of the following Detailed Description and a review of the associated drawings.

DESCRIPTION OF THE DRAWINGS

Like reference numerals indicate like elements in the drawings. Elements are not drawn to scale unless otherwise indicated.

DETAILED DESCRIPTION

Figure 1:
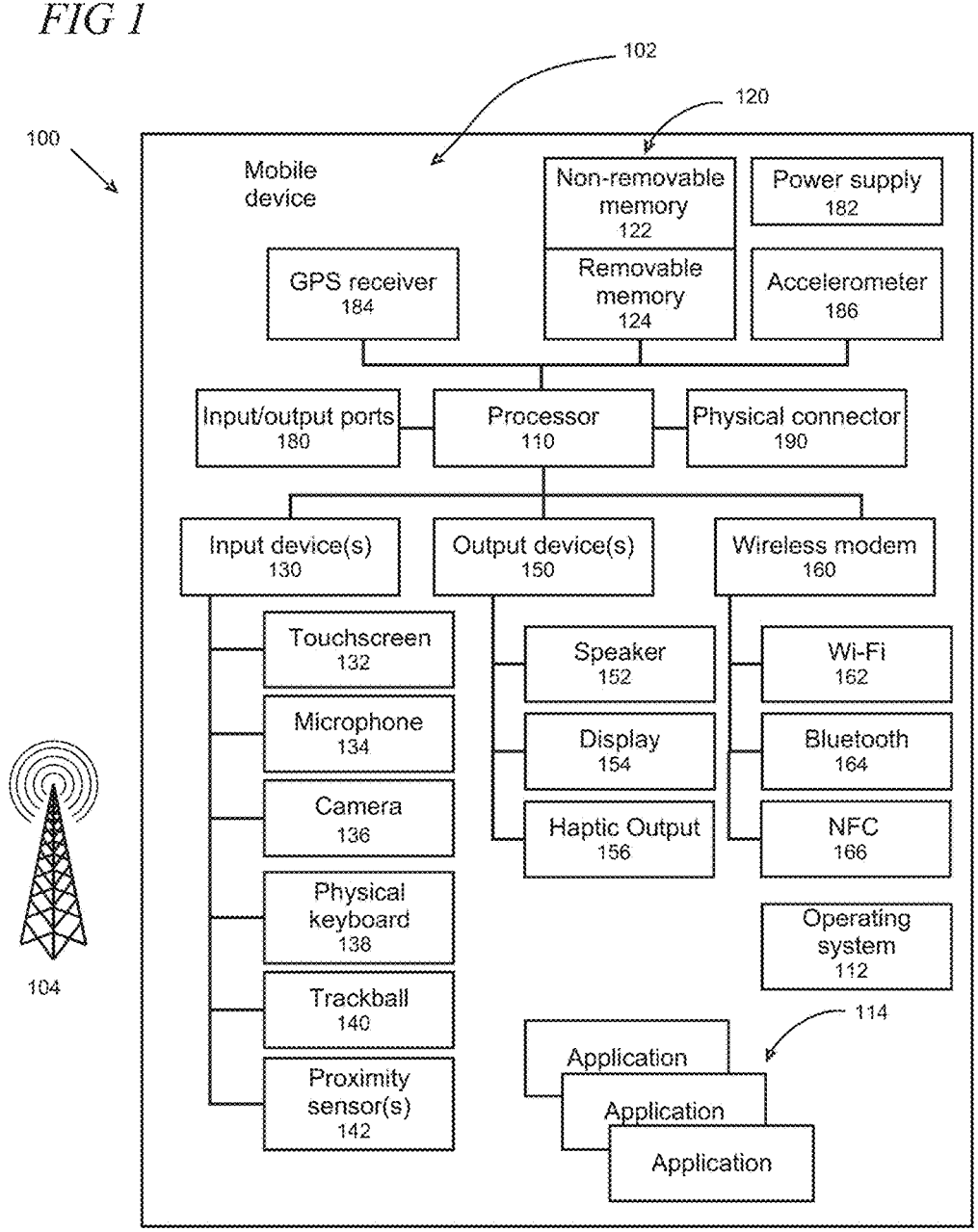
FIG. 1 is a functional block diagram of an illustrative mobile device.

FIG. 1 is a functional block diagram of an illustrative mobile device 100 including a variety of optional hardware and software components, shown generally at 102. Any component 102 in the mobile device can typically communicate with any other component, although, for ease of illustration, not all connections are shown. In the discussion that follows, the term "mobile device" refers to a portable device that is configured with communication capabilities and which is capable of wireless two-way communications with one or more communication networks 104, such as cellular, short-range, Wi-Fi, or satellite networks. Mobile devices are typically lightweight and powered with a rechargeable battery, and the devices are generally small enough to fit inside a pocket, purse, backpack, or the like. Accordingly, the mobile device 100 can encompass a variety of computing devices such as cell phones, smartphones, handheld computers, PDAs (personal digital assistants), and tablet computers. Other illustrative mobile devices may variously include portable media players, phablet devices (i.e., combination smartphone/tablet devices), wearable computers, navigation devices such as GPS (Global Positioning System) systems, portable gaming systems, or the like.

The mobile device 100 can include a controller or processor 110 (e.g., signal processor, microprocessor, microcontroller, ASIC (Application Specific Integrated Circuit), or other control and processing logic circuitry) for performing various tasks as signal coding, data processing, input/output processing, power control, and/or other functions. An operating system 112 can control the allocation and usage of the components 102, including power states, above-lock states, and below-lock states, and provides support for one or more application programs 114. The application programs can include common mobile computing applications (e.g., image-capture applications, email applications, calendars, contact managers, web browsers, messaging applications), or other computing application.

The mobile device 100 can include memory 120. Memory 120 can include non-removable memory 122 and/or removable memory 124. The non-removable memory 122 can include RAM, ROM, Flash memory, a hard disk, or other well-known memory storage technologies. The removable memory 124 can include Flash memory or a Subscriber Identity Module (SIM) card, which is well known in GSM (Global System for Mobile communications) systems, or other well-known memory storage technologies, such as "smart cards." The memory 120 can be used for storing data and/or code for running the operating system 112 and the application programs 114. Example data can include web pages, text, images, sound files, video data, or other data sets to be sent to and/or received from one or more network servers or other devices via one or more wired or wireless networks.

The memory 120 may also be arranged as, or include, one or more computer-readable storage media implemented in any method or technology for storage of information such as computer-readable instructions, data structures, program modules or other data. For example, computer-readable media includes, but is not limited to, RAM, ROM, EPROM, EEPROM, Flash memory or other solid state memory technology, CD-ROM (compact-disc ROM), DVD, (Digital Versatile Disc) HD-DVD (High Definition DVD), Blu-ray, or other optical storage, magnetic cassettes, magnetic tape, magnetic disk storage or other magnetic storage devices, or any other medium which can be used to store the desired information and which can be accessed by the mobile device 100.

The memory 120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The mobile device 100 can support one or more input devices 130, such as a touch screen 132; microphone 134 for implementation of voice input for voice recognition, voice commands and the like; camera 136; physical keyboard 138; trackball 140; and/or proximity sensor 142; and one or more output devices 150, such as a speaker 152, one or more displays 154, or a haptic output device 156 (e.g., without limitation, a rotary motor having an eccentrically weighted shaft) for haptic output. Other input devices (not shown) using gesture recognition may also be utilized in some cases. Other possible output devices (not shown) can include piezoelectric actuators or other suitable components that employ piezoelectric effects. Some devices can serve more than one input/output function. For example, touchscreen 132 and display 154 can be combined into a single input/output device.

A wireless modem 160 can be coupled to an antenna (not shown) and can support two-way communications between the processor 110 and external devices, as is well understood in the art. The modem 160 is shown generically and can include a cellular modem for communicating with the mobile communication network 104 and/or other radio-based modems (e.g., Bluetooth 164, Wi-Fi 162, and/or Near Field Communication (NFC) 166). The wireless modem 160 is typically configured for communication with one or more cellular networks, such as a GSM network for data and voice communications within a single cellular network, between cellular networks, or between the mobile device and a public switched telephone network (PSTN).

The mobile device 100 can further include at least one input/output port 180, a power supply 182, a satellite navigation system receiver 184, such as a GPS receiver, an accelerometer 186, a gyroscope (not shown), and/or a physical connector 190, which can be a USB port, IEEE 1394 (FireWire) port, and/or an RS-232 port. The illustrated components 102 are not required or all-inclusive, as any components can be deleted and other components can be added.

Figure 2:
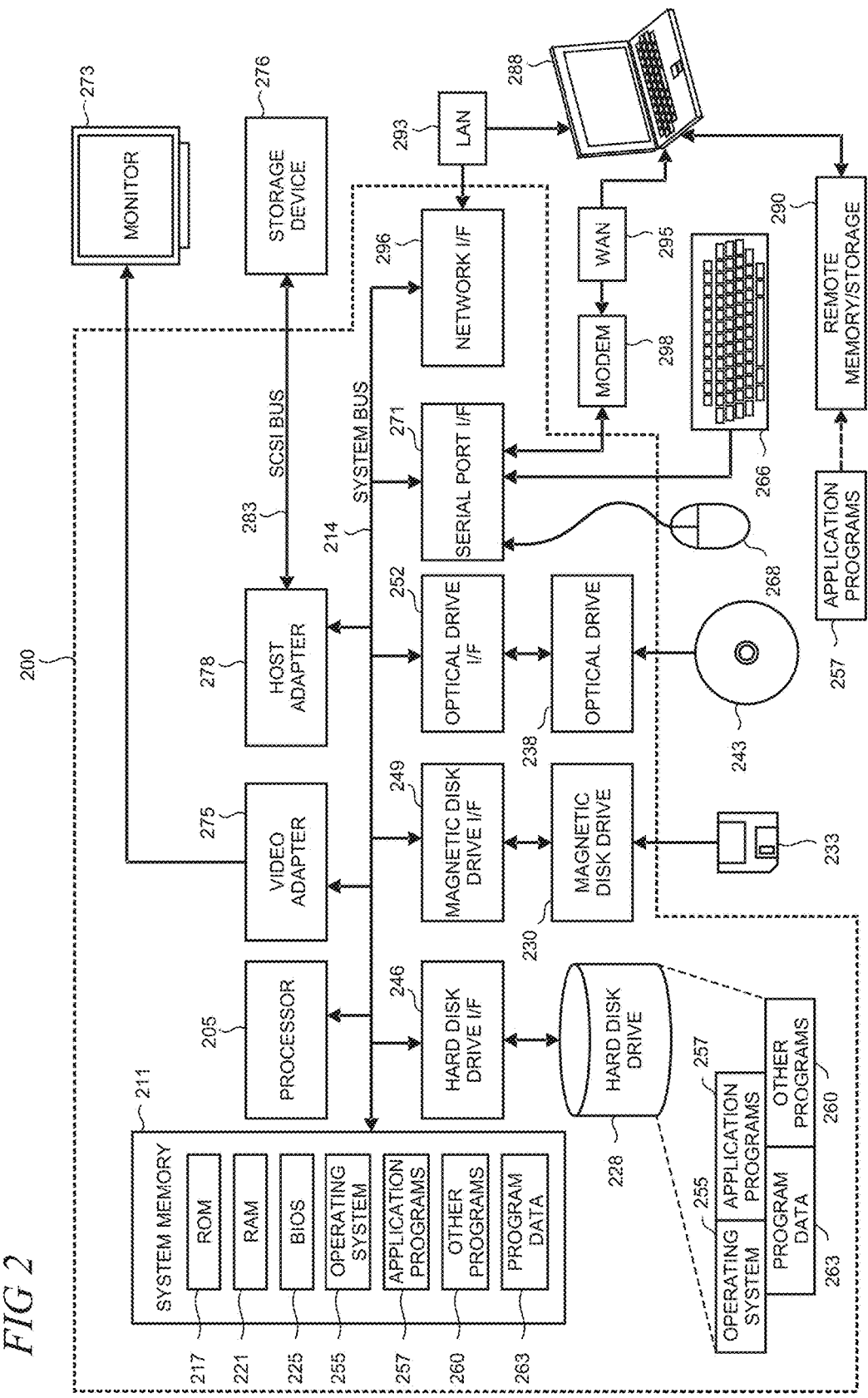
FIG. 2 is a functional block diagram of an illustrative computer system; that may be utilized as a desktop device.

FIG. 2 is a simplified block diagram of an illustrative computer system 200 such as a PC, client machine, or server which may be utilized as a desktop device with which the present physical and virtual phone mobility may be implemented. As used here, the term "desktop device" refers to computing platforms and systems that are physically larger than mobile devices and which may be used in usage scenarios in which the device is installed on a semi-permanent or fixed basis such as in a home office, enterprise, or business environment, and the like. Desktop devices can also include laptop and notebook computers and similar devices that are portable and battery powered but which are typically physically larger than mobile devices.

Computer system 200 includes a processor 205, a system memory 211, and a system bus 214 that couples various system components including the system memory 211 to the processor 205. The system bus 214 may be any of several types of bus structures including a memory bus or memory controller, a peripheral bus, or a local bus using any of a variety of bus architectures. The system memory 211 includes read only memory (ROM) 217 and random access memory (RAM) 221. A basic input/output system (BIOS) 225, containing the basic routines that help to transfer information between elements within the computer system 200, such as during startup, is stored in ROM 217. The computer system 200 may further include a hard disk drive 228 for reading from and writing to an internally disposed hard disk (not shown), a magnetic disk drive 230 for reading from or writing to a removable magnetic disk 233 (e.g., a floppy disk), and an optical disk drive 238 for reading from or writing to a removable optical disk 243 such as a CD (compact disc), DVD (digital versatile disc), or other optical media. The hard disk drive 228, magnetic disk drive 230, and optical disk drive 238 are connected to the system bus 214 by a hard disk drive interface 246, a magnetic disk drive interface 249, and an optical drive interface 252, respectively. The drives and their associated computer-readable storage media provide non-volatile storage of computer-readable instructions, data structures, program modules, and other data for the computer system 200. Although this illustrative example includes a hard disk, a removable magnetic disk 233, and a removable optical disk 243, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present physical and virtual phone mobility. In addition, as used herein, the term computer-readable storage media includes one or more instances of a media type (e.g., one or more magnetic disks, one or more CDs, etc.). For purposes of this specification and the claims, the phrase "computer-readable storage media," and variations thereof, does not include waves, signals, and/or other transitory and/or intangible communication media.

A number of program modules may be stored on the hard disk, magnetic disk 233, optical disk 243, ROM 217, or RAM 221, including an operating system 255, one or more application programs 257, other program modules 260, and program data 263. A user may enter commands and information into the computer system 200 through input devices such as a keyboard 266 and pointing device 268 such as a mouse. Other input devices (not shown) may include a microphone, joystick, game pad, satellite dish, scanner, trackball, touchpad, touch screen, touch-sensitive device, voice-command module or device, user motion or user gesture capture device, or the like. These and other input devices are often connected to the processor 205 through a serial port interface 271 that is coupled to the system bus 214, but may be connected by other interfaces, such as a parallel port, game port, or universal serial bus (USB). A monitor 273 or other type of display device is also connected to the system bus 214 via an interface, such as a video adapter 275. In addition to the monitor 273, personal computers typically include other peripheral output devices (not shown), such as speakers and printers. The illustrative example shown in FIG. 2 also includes a host adapter 278, a Small Computer System Interface (SCSI) bus 283, and an external storage device 276 connected to the SCSI bus 283.

The computer system 200 may be operable in a networked environment using logical connections to one or more remote computers, such as a remote computer 288. The remote computer 288 may be selected as another personal computer, a server, a router, a network PC, a peer device, or other common network node, and typically includes many or all of the elements described herein relative to the computer system 200, although only a single representative remote memory/storage device 290 is shown in FIG. 2. The logical connections depicted in FIG. 2 include a local area network (LAN) 293 and a wide area network (WAN) 295. Such networking environments are often deployed, for example, in offices, enterprise-wide computer networks, intranets, and the Internet.

When used in a LAN networking environment, the computer system 200 is connected to the local area network 293 through a network interface or adapter 296. When used in a WAN networking environment, the computer system 200 typically includes a broadband modem 298, network gateway, or other means for establishing communications over the wide area network 295, such as the Internet. The broadband modem 298, which may be internal or external, is connected to the system bus 214 via a serial port interface 271. In a networked environment, program modules related to the computer system 200, or portions thereof, may be stored in the remote memory storage device 290.

It is noted that the network connections shown in FIG. 2 are illustrative and other means of establishing a communications link between the computers may be used depending on the specific requirements of an application of the present physical and virtual phone mobility. For example, the communications link between the computers can include Wi-Fi connectivity and/or short-range communications such as Bluetooth wireless and NFC.

Figure 3:
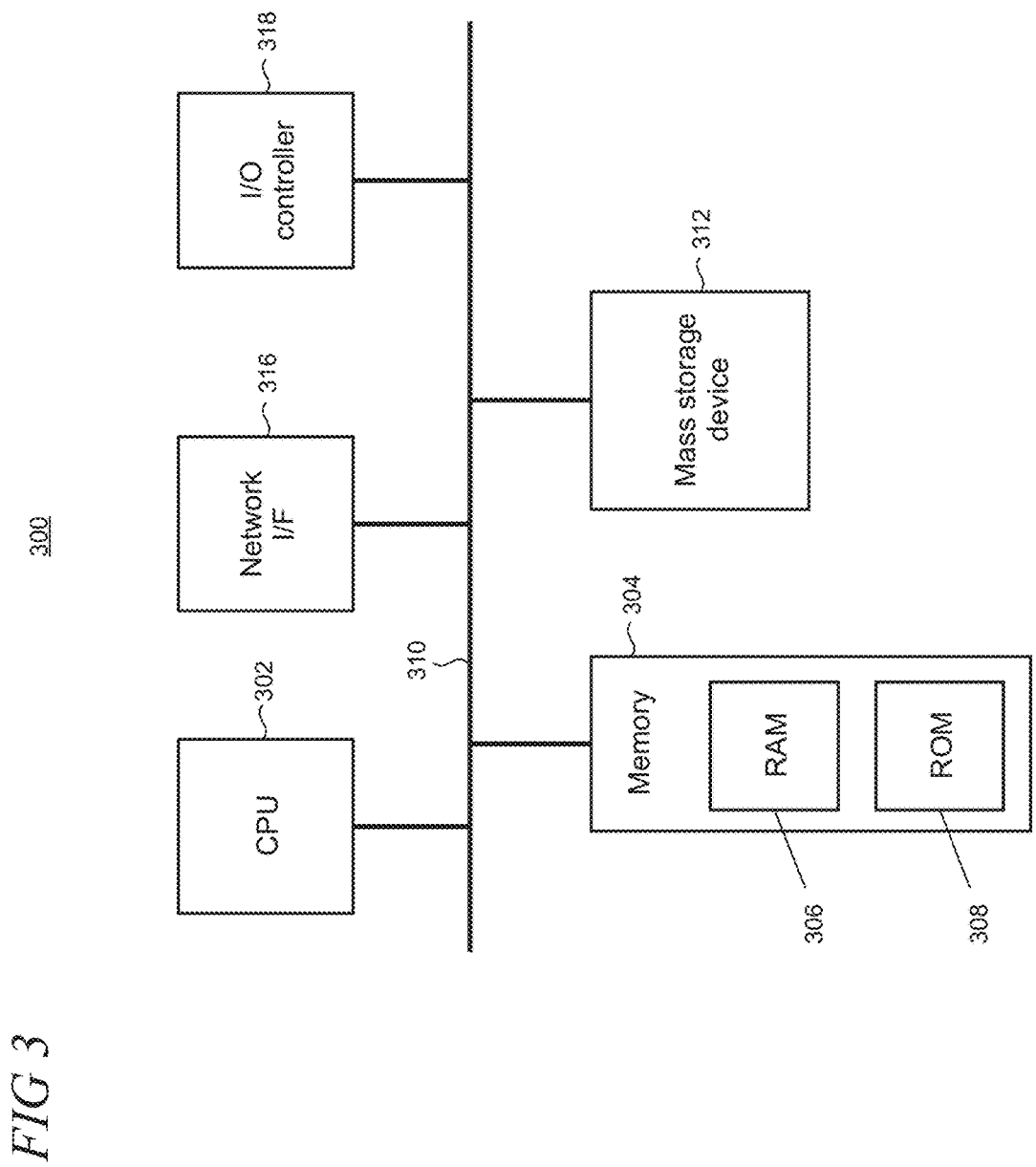
FIG. 3 shows an illustrative architecture for a device that is capable of executing various components for providing the present physical and virtual phone mobility.

FIG. 3 shows an illustrative architecture 300 for a device capable of executing the various components described herein for providing the present physical and virtual phone mobility. Thus, the architecture 300 illustrated in FIG. 3 may be adapted for a server computer, mobile phone, a PDA, a smartphone, a desktop computer, a netbook computer, a tablet computer, GPS device, gaming console, and/or a laptop computer. The architecture 300 may be utilized to execute any aspect of the components presented herein.

The architecture 300 illustrated in FIG. 3 includes a CPU (Central Processing Unit) 302, a system memory 304, including a RAM 306 and a ROM 308, and a system bus 310 that couples the memory 304 to the CPU 302. A basic input/output system containing the basic routines that help to transfer information between elements within the architecture 300, such as during startup, is stored in the ROM 308. The architecture 300 further includes a mass storage device 312 for storing software code or other computer-executed code that is utilized to implement applications, the file system, and the operating system.

The mass storage device 312 is connected to the CPU 302 through a mass storage controller (not shown) connected to the bus 310. The mass storage device 312 and its associated computer-readable storage media provide non-volatile storage for the architecture 300.

Although the description of computer-readable storage media contained herein refers to a mass storage device, such as a hard disk or CD-ROM drive, it may be appreciated by those skilled in the art that computer-readable storage media can be any available storage media that can be accessed by the architecture 300.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 300.

The architecture 300 may operate in a networked environment using logical connections to remote computers through a network. The architecture 300 may connect to the network through a network interface unit 316 connected to the bus 310. The network interface unit 316 also may be utilized to connect to other types of networks and remote computer systems. The architecture 300 may include an input/output controller 318 for receiving and processing input from a number of other devices, including a keyboard, mouse, or electronic stylus (not shown in FIG. 3). Similarly, the input/output controller 318 may provide output to a display screen, a printer, or other type of output device (also not shown in FIG. 3).

It may be appreciated that the software components described herein may, when loaded into the CPU 302 and executed, transform the CPU 302 and the overall architecture 300 from a general-purpose computing system into a special-purpose computing system customized to facilitate the functionality presented herein. The CPU 302 may be constructed from any number of transistors or other discrete circuit elements, which may individually or collectively assume any number of states. More specifically, the CPU 302 may operate as a finite-state machine, in response to executable instructions contained within the software modules disclosed herein. These computer-executable instructions may transform the CPU 302 by specifying how the CPU 302 transitions between states, thereby transforming the transistors or other discrete hardware elements constituting the CPU 302.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 300 in order to store and execute the software components presented herein. It may also be appreciated that the architecture 300 may include other types of computing devices, including handheld computers, embedded computer systems, smartphones, PDAs, and other types of computing devices known to those skilled in the art. It is also contemplated that the architecture 300 may not include all of the components shown in FIG. 3, may include other components that are not explicitly shown in FIG. 3, or may utilize an architecture completely different from that shown in FIG. 3.

The illustrative computing hardware and architecture discussed above may be utilized to support platforms that are configured to host virtual machines that simulate physical hardware. For example, applications running in a virtual machine can migrate seamlessly between different physical devices. Tasks relating to the operation of a mobile device and/or execution of the application, as well as resources, may be migrated or transferred to the desktop device from the mobile device, or vice versa. In some cases, device state data may be transferred in the migration process.

In an illustrative example, software, hardware, firmware, or combinations or sub-combinations thereof may be utilized to implement a "virtual machine phone" (VMPhone) on a desktop device such as a PC, in which the desktop device functions as a surrogate or proxy for a mobile device supporting voice telephony or communication. For example, when a call is made to the mobile device's phone number, either the mobile device, the VMPhone, or both can ring. Outbound calls from the VMPhone can appear to the phone network as if they originated on the mobile device, for example, for Caller ID purposes. Applications installed on the mobile device can execute on the VMPhone—either fully in standalone mode, or partially in paired mode—while appearing and behaving as if they were running on the mobile device.

Use of the VMPhone can provide a number of technical advantages. The desktop device may have available hardware and/or software resources to carry out tasks associated with a given application installed on the mobile device in a more efficient and/or optimal manner that improves device operations and/or preserves limited resources. For example, in both standalone and paired modes, the load on the limited resources of the mobile device (for example, battery capacity, memory, network bandwidth, or processor cycles) can be reduced by transferring tasks from the mobile device to the desktop device. In paired mode, the desktop device may be provided with an additional communications link by the cellular connection supported by the mobile device that may be more robust or more secure in some cases. User efficiency when interacting with the virtualized telephony application may also be increased by virtue of the desktop device's typically larger user interfaces including display and keyboard. Thus, migration of the mobile device's telephony application to the VMPhone on the desktop device provides the user with the full telephony utility of the mobile device with an improved user experience and the added convenience of not having to physically access the device to make and receive calls.

Figure 4:
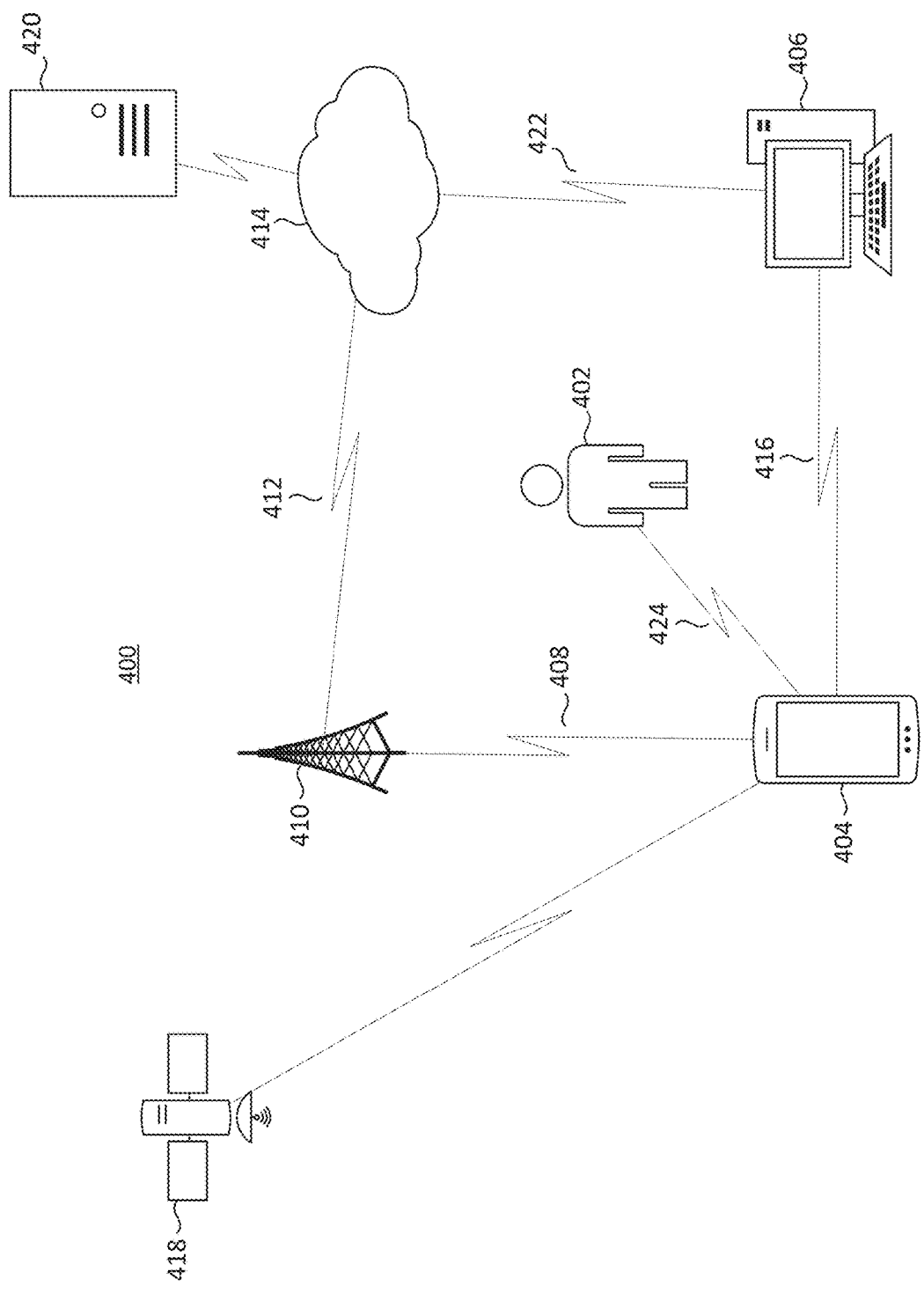
FIG. 4 shows an illustrative use case of a system that is configured for physical and virtual phone mobility.

FIG. 4 shows an illustrative use case of a system 400 that is configured for physical and virtual phone mobility. A user 402 may carry a mobile device 404 within proximity of a desktop device 406. The mobile device 404 may be in radio communication 408 with a cellular transmitter 410. The cellular transmitter 410 is in turn in communication 412 with a one or more wide area networks (representatively indicated by reference numeral 414), which may, for example include portions of the Internet, in order to access data sources and other resources and conduct telephony communication. The desktop device 406 also includes a communication link 422 with the network 414.

The proximity of the mobile device 404 to the desktop device 406 within some predetermined threshold can be utilized as a trigger for the mobile and desktop devices to share application tasks, resources, and/or state. In some implementations, the term proximity includes the concept of "physical proximity" and refers to the relative physical locations of the devices with respect to one another based on a dimension of distance. In other implementations, proximity can be described with non-distance-based dimensions and/or constructs. For example, the user may access a home networking environment with one or more servers and multiple network-connected devices each of which support user interaction. Since multiple devices at various distances away can support interactions with the mobile device, there is not necessarily a single explicit desktop for determining distance. In such environments the concept of "logical proximity" may be used to describe the relationship of the mobile device to networked devices where the parameters applicable to or describing logically proximate elements can vary by implementation. Either or both physical and logical proximity may be utilized as a sharing trigger and the particular type of proximity that is applicable will typically be readily apparent according to the use scenario at hand.

Determining the proximity of the mobile device 404 to the desktop device 406 can be accomplished in a variety of ways. In one illustrative implementation, the mobile device 404 and the desktop device 406 may communicate directly with one another over a short range communication link 416. For example, NFC is typically effective within a relatively limited range. Therefore, in cases in which the desktop device 406 and the mobile device 404 are equipped for NFC, the ability of the mobile device 404 and the desktop device 406 to engage in NFC contact can indicate their relative proximity. A similar proximity determination can also be accomplished using Wi-Fi communication, Bluetooth communication, or any other suitable short range communication technology.

In other implementations of physical and virtual phone mobility, proximity between the mobile device 404 and the desktop device 406 can be established by geolocation of one or both devices. In certain instances, the desktop device 406 has a registered location. In other instances, a desktop device can be located by reference to a location associated with its IP address. Alternatively, the mobile device 404 may use signals received from a Global Navigation Satellite System (GNSS) 418, which may include one or more of Global Positioning System (GPS), GLONASS, Galileo or Beidou, to determine its location. Thereafter, the mobile device 404 and the desktop device 406 may communicate with one another, either by local and direct communication link 416, or by communication using the network 414, to compare their positions to determine relative proximity.

In another illustrative implementation, the control of sharing and transfer of tasks between mobile device 404 and desktop device 406 may reside with a remote server 420. This server 420 may be in communication with both the mobile device 404 and the desktop device 406, respectively, using network 414. In this implementation, the server 420 receives information about the location of the mobile device 404 and the desktop device 406. Using the received information, the server 420 may decide whether the mobile device 404 and the desktop device 406 are within the threshold proximity in order to share and/or transfer tasks and applications, and communicate an instruction to the mobile device 404 and the desktop device 406, respectively, to perform such sharing and/or transfer.

The transfer and/or sharing of functionality between the mobile device 404 and the desktop device 406 may also be initiated manually by the user 402 in some implementations. The user 402 can initiate transfer and/or sharing of functionality by interacting with either or both the mobile device 404 and the desktop device 406.

Once a transfer and/or sharing of functionality between the mobile device 404 and the desktop device 406 is initiated, a comparative assessment is typically made of the relative device capabilities and resources available to each of the mobile device 404 and the desktop device 406. For example, each of the mobile device 404 and the desktop device 406 may have a registry or similar construct indicating drivers for various peripheral devices, for example and without limitation, input devices such as keyboard, mouse, or touchscreen/touchpad and output devices such as visual display, sound producing, or the like. Each peripheral device or component of either the mobile device 404 or the desktop device 406 will typically have a driver associated with it, to permit the operating system to interface with and make use of the peripheral device. The presence of the driver file can be one indicator of the peripheral devices available to each of the mobile device 404 and the desktop device 406.

The comparative assessment of available resources does not necessarily need to be performed each time task sharing is initiated. For example, when a comparison is made, results can be stored (for example, using a local cache or using a remote resource such as an enterprise or cloud-based server) and persisted across multiple sharing sessions. In some cases, a comparison or assessment can be performed on a partial basis, for example, when a changed device state and/or an occurrence of an event or change in environment or context warrant an update to the stored results. In some cases, the comparing can be skipped, in whole or part, and appropriate assessment information can be accessed from a remote resource that can be used to supplement or replace local information.

The decision-making and control functions of the system 400 can be instantiated in any of the mobile device 404, the desktop device 406, the remote server device 420, or be distributed among the devices in various combinations or sub-combinations. In certain embodiments, the system 400 is not fully automated, but utilizes input from the user 402. For example, the user may be provided with a communication 424 or other suitable notification of a proposal or recommendation by the system 400 to transfer one or more functions between the mobile device 404 and the desktop device 406. For example, the communication may be visual, auditory, haptic, or use some combination of such elements. The user may explicitly respond with an input to accept or reject the proposed transfer. In some embodiments, after elapse of a predetermined period of time, the system 400 may presume acceptance of the transfer based upon no action from the user 402. In other embodiments, the system 400 completes the transfer only with explicit user approval. In the depicted embodiment, communication 424 is initiated from the mobile device 404. In other implementations, it may come from the desktop device 406, or the server device 420. In other implementations, the remote server device 420 may provide another resource pool for sharing of tasks and applications among devices.

Figure 5:
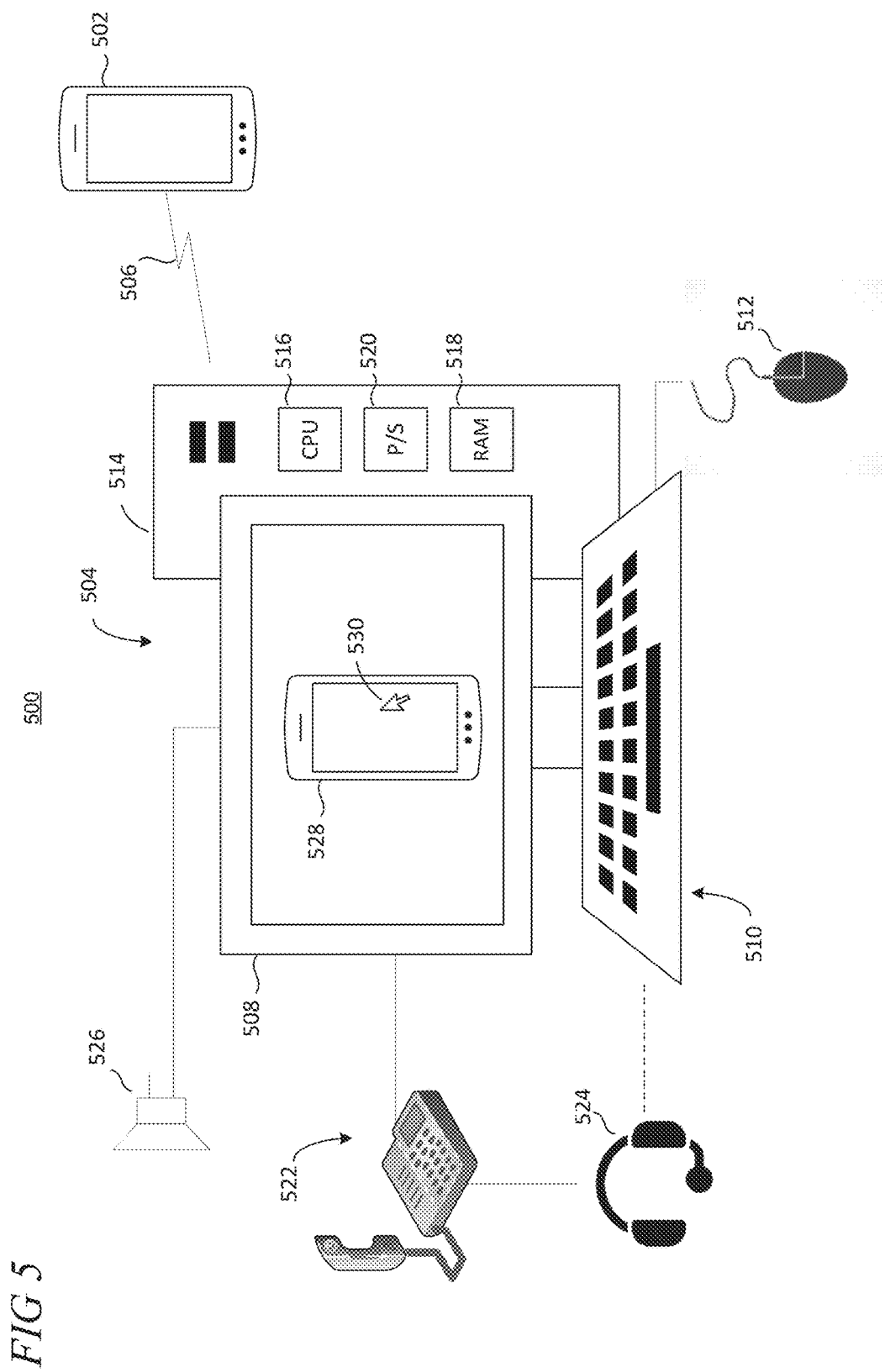
FIG. 5 shows an illustrative system for sharing tasks and applications between mobile and desktop devices.

FIG. 5 shows an illustrative system 500 for sharing tasks and applications between a mobile device 502 and a desktop device 504. The mobile device 502 and the desktop device 504 may be in direct or indirect communication utilizing a communication link 506, as described above. The desktop device 504 can include one or more hardware components such as, without limitation, a visual display 508, which may include a touchscreen, a keyboard 510, and a pointer device 512, which may include a mouse, a touch pad, a track pad, a trackball, or other component or device that supports a suitable emulation of touch interaction, etc. The desktop device 504 can include an enclosure 514, housing, for example, a processor or CPU 516 and a storage device 518, such as RAM, ROM, hard disk drive, removable media, etc. The enclosure 514 will also typically house a power supply 520 that is coupled to an AC power source to power the desktop device 504. The desktop device 504 may include a desktop telephone 522, for example to engage in network telephony calls (IMS, VOIP, or the like). The desktop device 504 may also include an audio headset 524 for input and/or output, either in connection with the desktop telephone 522 or directly with the desktop device 504. The desktop device 504 can further include an audio speaker system 526.

Upon initiation of a transfer or sharing of functionality between the mobile device 502 and the desktop device 504, the desktop device 504 can cause a virtual instance 528 of the mobile device to be shown on the display 508. In some cases, the mobile device 502 provides for user interaction through a touchscreen display. For the virtual instance 528 of the mobile device supported on the desktop device, user interaction can also be performed using a touchscreen if the display 508 supports touch-sensitive input. Alternatively, interaction can be supported using a pointer device 512, which controls a pointer 530 or cursor on the display 508 relative to the virtual instance 528 of the mobile device.

Figure 6:
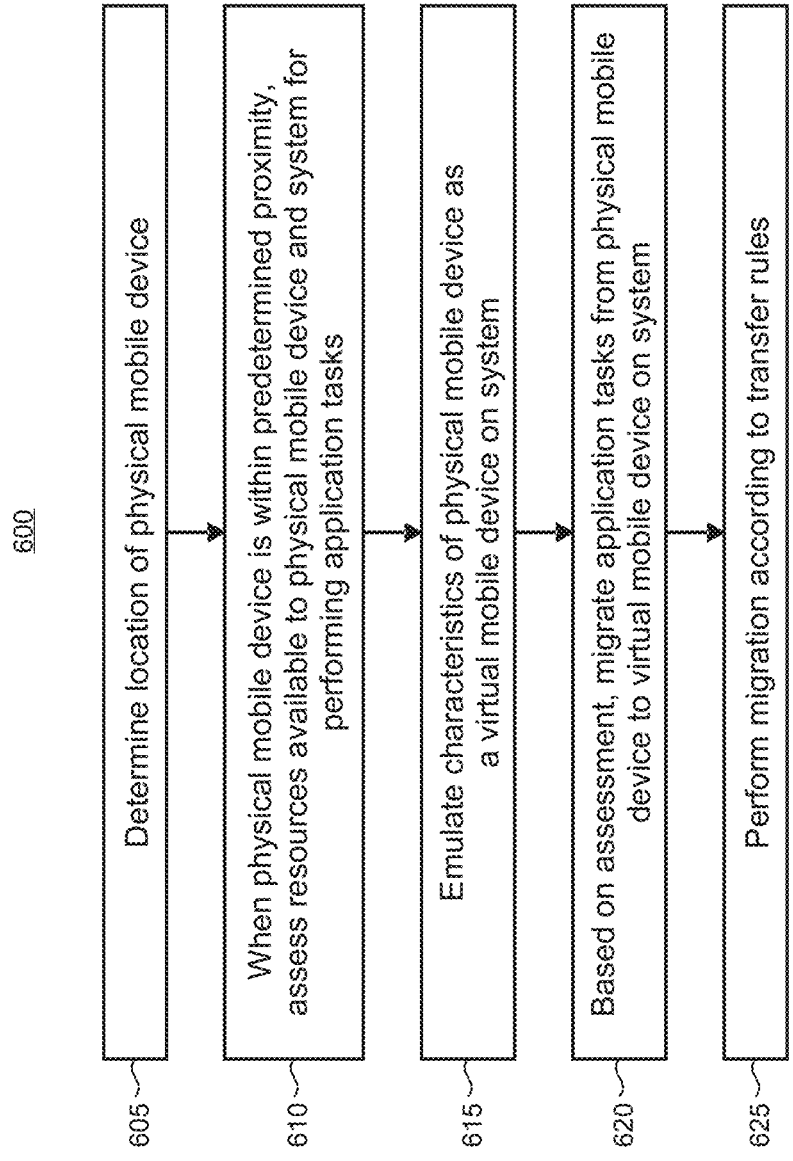
FIGS. 6-8 show illustrative methods.

FIG. 6 shows an illustrative method 600 for optimizing operations in a mobile device. Method 600 may be performed, for example, by a system such as a PC or similar computing platform that may be utilized as a desktop device. Unless specifically stated, the methods or steps shown in the flowchart and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 605, a determination of a physical mobile device is made. The system can use one of the various ways discussed above to make the location determination. In some cases the system can be in communication with a location-aware mobile device in order to make the location determination. In other cases, the system can make the determination itself, or be in communication with an external service or resource that is capable of determining the proximity of the physical mobile device to the system.

In step 610, when the physical mobile device is determined to be within a predetermined proximity, then an assessment is made of resources that are available to the physical mobile device and the system. The predetermined proximity can vary by implementation and may depend, in part, on the resolution of the methodology used to determine location. In typical cases, the physical mobile device will be relatively near to the system, for example, when a user sits down in front of a desktop PC with the mobile device in a pocket or in a nearby pocketbook or backpack. The assessment can include all the resources that are available to the physical mobile device and system, but may also be more limited, in some implementations, and include a subset of resources that are associated with a particular executable application that is installed on the physical mobile device. For example, the particular application may comprise a telephony application.

In step 615, characteristics of the physical mobile device are emulated as a virtual mobile device on the system. The emulated characteristics do not necessarily need to correspond identically with the actual characteristics of the physical mobile device. Indeed, the virtual mobile device can emulate a different model and/or manufacturer, support a different operating system, and provide a different feature set as compared to the physical mobile device. In step 620, based on the assessment of the respective resources on the physical mobile device and system, tasks associated with the executable application can be migrated from the physical mobile device to the virtual mobile device. Device and/or data may also be transferred in some implementations.

In step 625, the task migration may be performed according to transfer rules. The transfer rules can be instantiated on the system, the physical mobile device, or a remote server, or a combination of two or more of such components. The transfer rules may take into account a variety of factors such as user preferences, user behaviors (in which user behaviors are typically tracked upon notice to the user and user consent), the capabilities and/or characteristics of the available resources such as processor speed, available capacities of memory and power, QoS/bandwidth/security of external telephony links, availability of peripheral devices (display monitors, speakers, microphones, keyboards, etc.), or the like. In some cases, the transfer rules when applied will help to optimize resource and application task allocation so that the user experience is enhanced, for example, while preserving scarce resources such as the battery level for the physical mobile device.

Application of the transfer rules may utilize one device resource over another depending on a particular task at hand. In an illustrative example, in the case of telephony communication, the mobile device may provide increased quality of service (QoS) through a cellular communication connection, as compared with the QoS of a VoIP (Voice over Internet Protocol) or other similar service that may be available to the desktop device. Therefore, in that case, for telephony communication, using the mobile device network connection provides for best call quality and user experience. Audio hardware may also be available to the desktop device that provides increased performance compared to that which is integral with the mobile device. In such cases, a portion of audio input and output tasks can be transferred to the desktop device, while a network communication function remains with the mobile device.

In another illustrative example, some applications may call for the input of text by a user. A full-size keyboard typically provides more efficient text entry with greater comfort and reduced errors as compared with a miniaturized and/or virtual touch-screen keyboard as may be provided with a mobile device. In such cases, an application calling for text input would have a task-based preference for a desktop device if a full-size keyboard peripheral is available to it.

The utilization of one resource over another can be prescribed by the application itself in some implementations and reflected in the transfer rules. For example, an application installed on the mobile device may be designed to make use of the touch-responsive input of the mobile device display. Transferring input tasks to a desktop that is not equipped with a touch-sensitive display, in which the interaction with a virtual instance of the mobile device is done through a mouse or trackball pointer, for example, may be sub-optimal. In that case, the application itself can store a device preference for a touch-sensitive display interface and the transfer rules can take into account the application-based preference when transferring application tasks.

Figure 7:
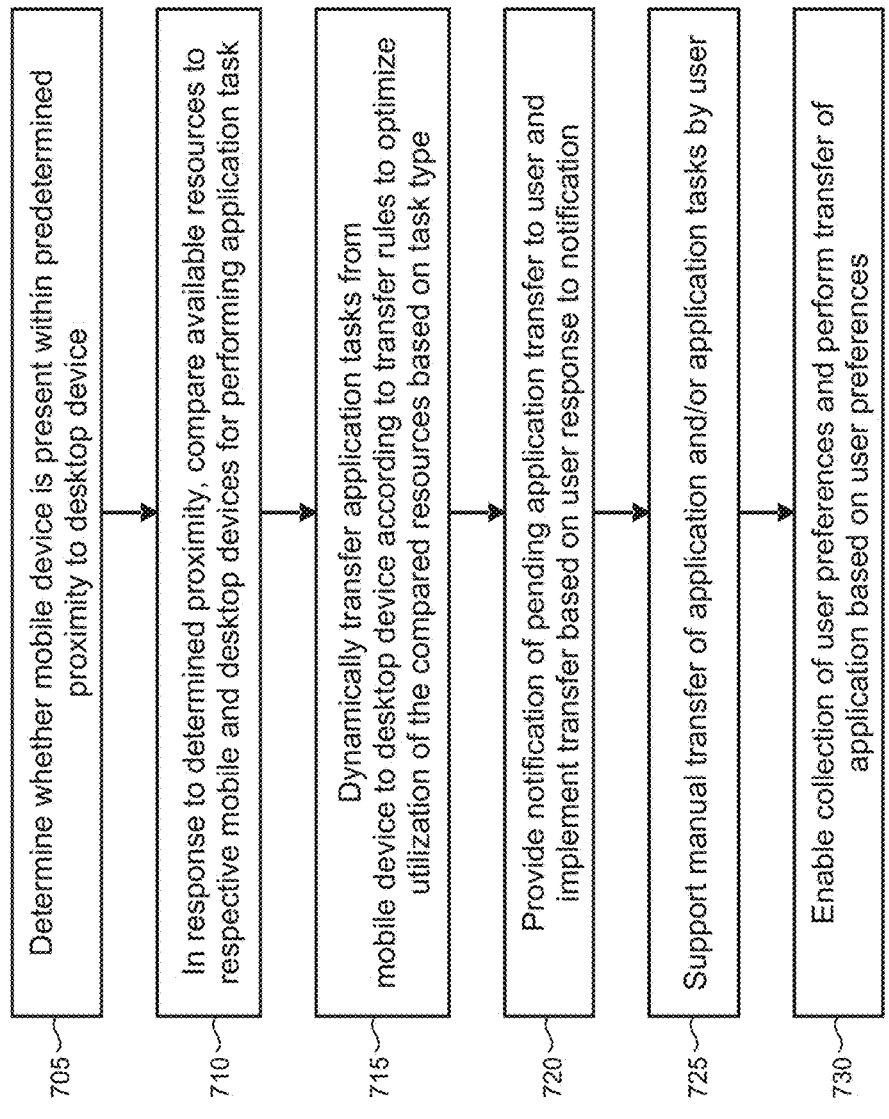

FIG. 7 shows an illustrative method 700 for sharing applications and resources between mobile and desktop devices. In step 705, a determination is made as to whether the mobile device is present within a predetermined proximity to the desktop device. In step 710, in response to the determined proximity, resources available to the respective devices which may be used during application operation are compared. In step 715, application tasks are dynamically transferred according to transfer rules so as to optimize utilization of the compared resources based on the task type. Thus, for example, some tasks that deal with UI such as keyboard input may be transferred, while other tasks dealing with device operation such as cellular network access may not be transferred. The transfer may be performed dynamically so that tasks, data, and state may be transferred back and forth between devices over the course of a given session depending on resource availability and utilization, as well as other circumstances and context.

In step 720, a pending application transfer can be included in a notification that is surfaced on either or both the mobile and desktop devices. In some implementations, the transfer can be completed with an explicit approval by the user, or in other implementations the transfer may be implemented unless the user explicitly rejects the transfer in response to the notification. The user may also manually initiate a transfer of the application and/or tasks from the mobile device to the desktop device in step 725. Various controls may also be surfaced on either or both of the mobile and desktop devices, in step 730, that enable the user to express preferences regarding application transfers. For example, the user may prefer that a cellular connection supported on the mobile device not be used if a VoIP connection is available on the desktop. The user's history of manual activations and the user preferences can be utilized, in some implementations, to make automated transfers of applications more accurate in reflecting user intent.

Figure 8:
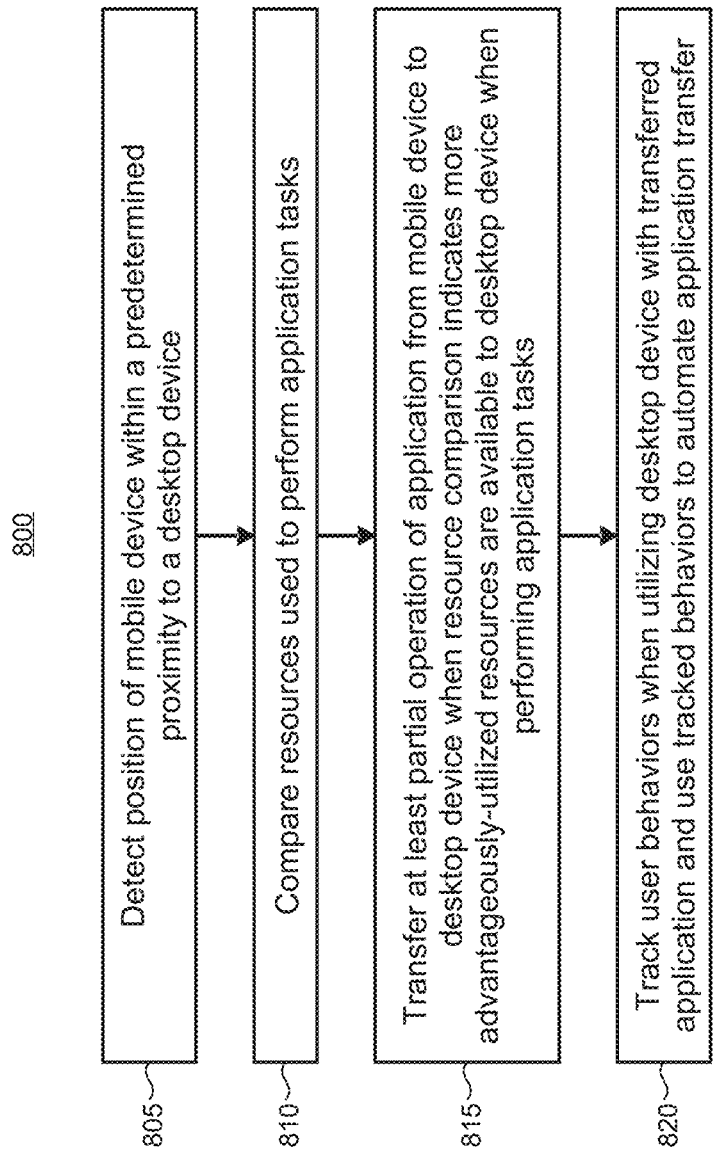

FIG. 8 shows an illustrative method 800 that may be implemented on a mobile device. In step 805, a position of the mobile device is detected within a predetermined proximity to a desktop device. The mobile device, for example, may be configured with a GNSS receiver or a short-range wireless or other suitable radio based technology to make a relative position determination. The resources available to the respective mobile and desktop devices which would be utilized to perform a task associated with an application on the mobile device are compared in step 810. In step 815, at least a partial transfer of the application from the mobile device to the desktop device is performed when the resource comparison indicates that more advantageously-utilized resources are available to the desktop device than the mobile device when performing the application task. The particular advantages realized by the application transfer can include, for example, technical advantages that improve device operation, reduce utilization of limited resources, increase the quality of the user experience, or improve user efficiency when interacting with the device. In step 820, when operation of an application is transferred to the desktop device, user behaviors and interactions can be tracked (typically with notice to the user of such tracking and user consent) to improve subsequent automated application transfers to better meet the user's needs and expectations.

Various exemplary embodiments of the present physical and virtual phone mobility are now presented by way of illustration and not as an exhaustive list of all embodiments. An example includes a system for optimizing operations in a mobile device, the system comprising: one or more processors; and one or more machine-readable memory devices, storing thereon a program of instructions for execution by the one or more processors, to thereby configure the system to determine whether a location of a physical mobile device is within a predetermined proximity of the system, when the physical mobile device is within the predetermined proximity of the system, assess resources of the physical mobile device for performing one or more tasks associated with an executable application on the physical mobile device and resources of the system for performing the one or more tasks, based on the assessment, emulate one or more characteristics of the physical mobile device as a virtual mobile device on the system, and migrate one or more tasks associated with the executable application from the physical mobile device to the virtual mobile device on the system.

In another example, the system is incorporated as a desktop device and further configured to emulate one or more characteristics on the virtual mobile device that are not supported on the physical mobile device. In another example, the system is further configured to transfer one of device state or data from the mobile device to the system. In another example, the application supports telephony and the emulated characteristics of the physical mobile device include telephony characteristics. In another example, transfer rules govern the migration of the one or more tasks using the assessment. In another example, the transfer rules are instantiated on one of the system, the physical mobile device, or a remote server, and the system includes a network interface for communicating with the remote server. In another example, the transfer rules account for quality of service or security of telephony connections available to either the system or the physical mobile device. In another example, the transfer rules account for at least one of user preferences, a history of user behaviors, or capabilities of assessed resources. In another example, the system is configured to store at least part of an assessment or is configured to access assessment information from a remote resource.

A further example includes a method for sharing application tasks between mobile and desktop devices, the method comprising: determining whether a mobile device is present within a predetermined physical or logical proximity to a desktop device; responsively to the determining, comparing resources available to the mobile device for performing a task associated with an application instantiated on the mobile device with corresponding resources available to the desktop device; and transferring at least partial operation of the application from the mobile device to the desktop device according to one or more transfer rules, the transferring being dynamically implemented to optimize resource utilization by the mobile device and the desktop device based on task type.

In another example, the method further comprises: communicating, to a user of the mobile device, a notification of a pending transfer of the application operation from the mobile device to the desktop device; receiving a user response to the notification; and transferring at least partial operation of the application from the mobile device to the desktop device based on the user response. In another example, the application instantiated on the mobile device supports telephony communication and the comparing includes comparing one or more of peripherals enabled for input of audio, peripherals enabled for output of audio, peripherals supporting a graphical user interface, peripherals supporting user input, peripherals supporting text-based input, quality of service (QoS) of an external telephony communication link, a security level of the external telephony link, or available bandwidth of the external telephony communication link. In another example, the comparing includes comparing one or more of a speed of respective processors in the mobile device and the desktop device, available capacities of respective storage devices in the mobile device and the desktop device, or available capacity of respective power sources in the mobile device and the desktop device. In another example, the transfer of at least partial operation of the application includes transferring one or more application tasks. In another example, the method further comprises: when the mobile device is determined to be present within the predetermined proximity to the desktop device, providing a control to a user to manually transfer at least partial operation of the application from the mobile device to the desktop device, the control being responsive to one of gesture, voice, or input to a user interface supported on either the mobile device or the desktop device. In another example, the method further comprises exposing one or more controls to the user to express preferences with regard to a transfer of operation of the application from the mobile device to the desktop device.

A further example includes a mobile device, comprising: at least one processor; at least one machine-readable memory device, storing thereon a program of instructions for execution by the at least one processor; at least one wireless communication modem; wherein the program of instructions, when executed by the at least one processor, causes the mobile device to detect a position of the mobile device within a predetermined proximity to a desktop device; compare resources of the mobile device utilized to perform one or more tasks related to an application on the mobile device with corresponding resources of the desktop device; and transfer at least partial operation of the application from the mobile device to the desktop device in response to a resource comparison that indicates the desktop device has more advantageously-utilized resources than the mobile device for performing the one or more tasks related to the application.

In another example, the mobile device further comprises: a global navigation satellite system (GNSS) receiver, wherein the program of instructions, when executed by the at least one processor, further causes the mobile device to use a position of the mobile device derived from the GNSS receiver to determine whether a position of the mobile device is within a predetermined proximity of a desktop device. In another example, the mobile device further comprises: a short-range wireless communication system operative with the wireless communication modem, wherein the program of instructions, when executed by the processor, further causes the mobile device to use the short-range wireless communication system to determine whether a position of the mobile device is within a predetermined proximity of the desktop device. In another example, the program of instructions, when executed by the at least one processor, further causes the mobile device to track user behaviors with regard to utilization of the desktop device to operate a transferred application; and use the tracked behaviors to automate the transfer of at least partial operation of the application when the mobile device is determined to be within the predetermined proximity to the desktop device.

Based on the foregoing, it may be appreciated that technologies for implementing physical and virtual phone mobility have been disclosed herein. Although the subject matter presented herein has been described in language specific to computer structural features, methodological and transformative acts, specific computing machinery, and computer-readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and may not be construed as limiting. Various modifications and changes may be made to the subject matter described herein without following the example embodiments and applications illustrated and described, and without departing from the true spirit and scope of the present invention, which is set forth in the following claims.

What is claimed:

1. A system for optimizing operations in a mobile device, the system comprising:
one or more processors; and
one or more machine-readable memory devices, storing thereon a program of instructions for execution by the one or more processors, to thereby configure the system to
determine whether a location of a physical mobile device is within a predetermined proximity of the system,
when the physical mobile device is determined to be present within the predetermined proximity to the system, provide one or more controls on a user interface of the physical mobile device or the system to a user to manually transfer at least partial operation of an application from the physical mobile device to the system, the one or more controls being responsive to one of gesture, voice, or input to the user interface supported on either the physical mobile device or the system,
expose the one or more controls to the user to express preferences for a transfer of operation of the application from the physical mobile device to the system, and
migrate one or more tasks associated with the application from the physical mobile device to the system.

2. The system of claim 1, in which the system is incorporated as a desktop device and further configured to emulate one or more characteristics of the physical mobile device and further to emulate one or more characteristics on a virtual mobile device on the system that are not supported on the physical mobile device.

3. The system of claim 1, in which the system is further configured to transfer one of device state or data from the mobile device to the system.

4. The system of claim 2, in which the application supports telephony and the emulated characteristics of the physical mobile device include telephony characteristics.

5. The system of claim 1, in which transfer rules govern the migration of the one or more task.

6. The system of claim 5, in which the transfer rules are instantiated on one of the system, the physical mobile device, or a remote server, and the system includes a network interface for communicating with the remote server.

7. The system of claim 5, in which the transfer rules account for quality of service or security of telephony connections available to either the system or the physical mobile device.

8. The system of claim 5, in which the transfer rules account for at least one of user preferences, a history of user behaviors, or capabilities of assessed resources.

9. The system of claim 1, further including configuring the system to store at least part of an assessment or configuring the system to access assessment information from a remote resource.

10. A method for sharing application tasks between mobile and desktop devices, the method comprising:
    determining whether a mobile device is present within a predetermined physical or logical proximity to a desktop device;
    responsively to the determining, comparing resources available to the mobile device for performing a task associated with an application instantiated on the mobile device with corresponding resources available to the desktop device;
    when the mobile device is determined to be present within the predetermined proximity to the desktop device, providing one or more controls on a user interface of the mobile device or the desktop device to a user to manually transfer at least partial operation of the application from the mobile device to the desktop device, the one or more controls being responsive to one of gesture, voice, or input to the user interface supported on either the mobile device or the desktop device;
    exposing the one or more controls to the user to express preferences for a transfer of operation of the application from the mobile device to the desktop device; and
    transferring at least partial operation of the application from the mobile device to the desktop device according to one or more transfer rules, the transferring being dynamically implemented to optimize resource utilization by the mobile device and the desktop device based on task type.

11. The method of claim 10, further comprising:
    communicating, to the user of the mobile device, a notification of a pending transfer of the application operation from the mobile device to the desktop device;
    receiving a user response to the notification; and
    transferring at least partial operation of the application from the mobile device to the desktop device based on the user response.

12. The method of claim 10, in which the application instantiated on the mobile device supports telephony communication and the comparing includes comparing one or more of peripherals enabled for input of audio, peripherals enabled for output of audio, peripherals supporting a graphical user interface, peripherals supporting user input, peripherals supporting text-based input, quality of service (QoS) of an external telephony communication link, a security level of the external telephony link, or available bandwidth of the external telephony communication link.

13. The method of claim 10, in which the comparing includes comparing one or more of a speed of respective processors in the mobile device and the desktop device, available capacities of respective storage devices in the mobile device and the desktop device, or available capacity of respective power sources in the mobile device and the desktop device.

14. The method of claim 10, in which the transfer of at least partial operation of the application includes transferring one or more application tasks.

15. A mobile device, comprising:
    at least one processor;
    at least one machine-readable memory device, storing thereon a program of instructions for execution by the at least one processor; and
    at least one wireless communication modem,
    wherein the program of instructions, when executed by the at least one processor, causes the mobile device to
    detect a position of the mobile device within a predetermined proximity to a desktop device;
    compare resources of the mobile device utilized to perform one or more tasks related to an application on the mobile device with corresponding resources of the desktop device;
    when the mobile device is determined to be present within the predetermined proximity to the desktop device, providing one or more controls on a user interface of the mobile device to a user to manually transfer at least partial operation of the application from the mobile device to the desktop device, the one or more controls being responsive to one of gesture, voice, or input to the user interface supported on the mobile device;
    exposing the one or more controls to the user to express preferences for a transfer of operation of the application from the mobile device to the desktop device; and
    transfer at least partial operation of the application from the mobile device to the desktop device in response to a resource comparison that indicates the desktop device has more advantageously-utilized resources than the mobile device for performing the one or more tasks related to the application.

16. The mobile device of claim 15, further comprising:
    a global navigation satellite system (GNSS) receiver,
    wherein the program of instructions, when executed by the at least one processor, further causes the mobile device to
    use a position of the mobile device derived from the GNSS receiver to determine whether a position of the mobile device is within a predetermined proximity of the desktop device.

17. The mobile device of claim 15, further comprising:
    a short-range wireless communication system operative with the wireless communication modem,
    wherein the program of instructions, when executed by the processor, further causes the mobile device to
    use the short-range wireless communication system to determine whether a position of the mobile device is within a predetermined proximity of the desktop device.

18. The mobile device of claim 15, wherein the program of instructions, when executed by the at least one processor, further causes the mobile device to
    track user behaviors with regard to utilization of the desktop device to operate a transferred application; and
    use the tracked behaviors to automate the transfer of at least partial operation of the application when the mobile device is determined to be within the predetermined proximity to the desktop device.

* * * * *